United States Patent
Shah et al.

(10) Patent No.: US 12,189,654 B2
(45) Date of Patent: *Jan. 7, 2025

(54) CONTENT SOURCE INTEGRATION

(71) Applicant: OPEN TEXT HOLDINGS, INC., Menlo Park, CA (US)

(72) Inventors: Rakesh Kumar Bipinchandra Shah, Hyderabad (IN); Paul Kieron Carl Narth, San Carlos, CA (US); Bean Huat Chua, Sunnyvale, CA (US); John W. Chang, San Jose, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,261

(22) Filed: Aug. 15, 2023

(65) Prior Publication Data
US 2023/0401231 A1 Dec. 14, 2023

Related U.S. Application Data

(63) Continuation of application No. 17/552,953, filed on Dec. 16, 2021, now Pat. No. 11,762,880, which is a continuation of application No. 16/866,318, filed on May 4, 2020, now Pat. No. 11,210,321.

(30) Foreign Application Priority Data

Apr. 8, 2020 (IN) .............................. 202041015470

(51) Int. Cl.
*G06F 16/27* (2019.01)
*G06F 16/182* (2019.01)
*H04L 67/06* (2022.01)
*H04L 67/1095* (2022.01)
*H04L 67/1097* (2022.01)

(52) U.S. Cl.
CPC .......... *G06F 16/273* (2019.01); *G06F 16/184* (2019.01); *H04L 67/06* (2013.01); *H04L 67/1095* (2013.01); *H04L 67/1097* (2013.01)

(58) Field of Classification Search
CPC ..... G06F 16/273; G06F 16/184; H04L 67/06; H04L 67/1095; H04L 67/1097
See application file for complete search history.

(56) References Cited

U.S. PATENT DOCUMENTS

| | | | |
|---|---|---|---|
| 10,924,528 B1* | 2/2021 | Korobov | H04L 67/12 |
| 2014/0025628 A1* | 1/2014 | Tse | G06F 16/93 |
| | | | 707/E17.01 |

* cited by examiner

*Primary Examiner* — El Hadji M Sall
(74) *Attorney, Agent, or Firm* — Sprinkle IP Law Group

(57) ABSTRACT

In one embodiment, a web content management system is coupled to remote resources via a framework that has one or more corresponding adapters which enable editing of content by invoking editors which are native to the respective remote resources. The system retrieves a content item from a remote resource and stores a copy of the content item in a local repository, while the original content item remains in the repository of the remote resource. A content item can be selected in in a local authoring tool, causing the system to examine the content item's metadata to identify the source repository and invoke the native editor of the corresponding remote resource, enabling editing of the content item using the native editor. The copy of the content item in the local repository can then be synchronized to the edited version of the content item in the remote resource.

20 Claims, 9 Drawing Sheets

CONTENT SOURCE INTEGRATION

RELATED APPLICATIONS

This application is a continuation of, and claims a benefit of priority under 35 U.S.C. 120 from, U.S. patent application Ser. No. 17/552,953, filed Dec. 16, 2021, issued as U.S. Pat. No. 11,762,880, entitled "CONTENT SOURCE INTEGRATION," which is a continuation of, and claims a benefit of priority under 35 U.S.C. 120 from, U.S. patent application Ser. No. 16/866,318, filed May 4, 2020, issued as U.S. Pat. No. 11,210,321, entitled "CONTENT SOURCE INTEGRATION," which claims priority to Indian Patent Application No. 202041015470, entitled "Content Source Integration," filed Apr. 8, 2020, all of which are hereby fully incorporated herein by reference for all purposes.

TECHNICAL FIELD

This disclosure relates generally to providing content management systems, and more particularly to systems, methods and products in which a content management system updates a locally stored copy of a content item originating at a cloud-based repository by invoking a native editor of the cloud-based repository, editing the content item in the cloud-based repository and synchronizing the locally stored copy of the content item with the edited content item in the cloud-based repository.

BACKGROUND

Web content management systems enable enterprises to manage and publish digital content. Web content management systems may include various capabilities, such as site design, content authoring, site and content editing and personalization. Web content management systems enable users to deliver rich digital customer experiences across many different digital channels, including websites, mobile platforms, email, social, commerce, composite applications, collaboration sites and portals, and more. A robust content management system can allow organizations to manage multiple websites, support multiple languages, and deliver multi-channel customer experiences.

Existing web content management systems may allow authors to access content that is stored on remotely located cloud-based filesharing systems. Commonly, digital content which is managed by a content management system is stored in a repository that is associated with the content management system. The content management system may provide tools which allow users to create or edit content, which can then be published so that it can be accessed by other users. Typically, content which is created or edited using the authoring tools of a content management system will be stored within a repository of the content management system. There may, however, be situations in which it is desirable to use the authoring tools provided by a content management system while retaining one or more pieces of the content itself in repositories which are separate from the content management system. This may be desirable for various purposes, such as maintaining control of the content outside the scope of the content management system. For instance, an enterprise may maintain repositories of content which it wishes to share with its partners using the tools of a content management system, but the enterprise may wish to retain control of the content, keeping it within its own repositories and retaining the ability to edit the content with its own tools rather than delegating this entirely to the content management system. Additionally, it may be necessary to ensure that only authorized users have access to the content, both at design time and at runtime.

SUMMARY

Embodiments disclosed herein provide solutions to one or more of the problems described above. In an exemplary embodiment, a web content management system is coupled to one or more cloud-based filesharing systems via a framework that has one or more corresponding adapters, where the content management system is configured to enable editing of content by invoking editors which are native to the respective cloud-based filesharing systems in which the content resides. The content management system is configured to retrieve a particular content item from a corresponding cloud-based filesharing system and to store a copy of the content item in a repository of the content management system, while the original content item remains in the repository of the cloud-based filesharing system. When an author wishes to edit a content item in the local repository, the author selects the content item in the local repository for editing in an editing tool of the content management system. The content management system examines the metadata of the content item to identify the source repository, which may be one of the cloud-based filesharing systems. The content management system then invokes the native editor of the source repository, edits the content item using the native editor, and then synchronizes the copy of the content item in the local repository to the edited version of the content item in the source repository.

One embodiment comprises a method for integrating content of a cloud repository in a content management system. In this method, a content management system retrieves a copy of a content item from a repository of a cloud-based file sharing system which is remote from the content management system and stores the copy of the content item in a local repository of the content management system. The content management system receives an indication of a user request to edit the copy of the content item and, in response to the indication, invokes a native editor of the remote repository. The user then edits the content item stored on the remote repository using the native editor. The copy of the content item in the local repository of the content management system may then be synchronized with the edited content item stored on the remote repository. The copy of the content item in the local repository may be provided by the content management system to a content server or a display server, either with or without having been synchronized to the content item in the remote repository.

In some embodiments, in response to the indication, the content management system examines metadata stored with the copy of the content item in the local repository, identifies from the metadata the remote repository in which the content item is stored, and invokes the native editor of the identified remote repository as indicated by the metadata. The metadata may include elements that are stored with the content item in the remote repository, as well as elements that are generated by the content management system and are not stored on the remote repository. In one embodiment, the metadata identifies the remote repository in which the content item is stored, as well as a link to the native editor associated with the remote repository. The metadata may include security information that is specific to an individual content item.

One alternative embodiment comprises a computer program product comprising a non-transitory computer-readable medium storing instructions executable by one or more processors to perform a method as described above.

Another alternative embodiment comprises a content management system having an authoring tool and an adaptable framework having one or more adapters, each adapter configured to communicate with a corresponding content resource (e.g., a repository of a cloud-based filesharing service) which is located remotely from the content management system. The authoring tool is configured to, for content items stored in a corresponding one of the remotely located repositories, retrieve a copy of the content item from the corresponding remotely located repository, store the copy of the content item in a local repository, and in response to an indication of a user request to edit the content item, and invoke a native editor associated with the corresponding remotely located repository. The content item stored in the corresponding remotely located repository is edited with the native editor and, if desired, the locally stored copy of the content item may be synchronized with the content item stored in the corresponding remotely located repository.

In one embodiment, the content management system has a plurality of adapters, where each adapter is configured to communicate with a different one of a set of remotely located repositories, each of which has a different native editor. The adaptable framework of the content management system may include an authentication layer, where in response to a request from a user to the authoring tool to access one of the content items, the authentication layer is configured to authenticate the user prior to enabling access to the content item. The authentication layer may be configured to authenticate the user by accessing a directory service that maintains data identifying one or more customer user groups and associated content items which each user group is authorized to access. The authentication layer may be configured to, in response to the request from the user to the authoring tool to access one of the content items, obtain a token authenticating the user, where the authentication layer is configured to provide the token to the adapter corresponding to the remotely located repository containing the content item in the request from the user. The adaptable framework may comprise a pluggable framework which is configured to accept, without changes to the adaptable framework or existing adapters, additional adapters which are configured to communicate with corresponding additional repositories which are located remotely from the content management system.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
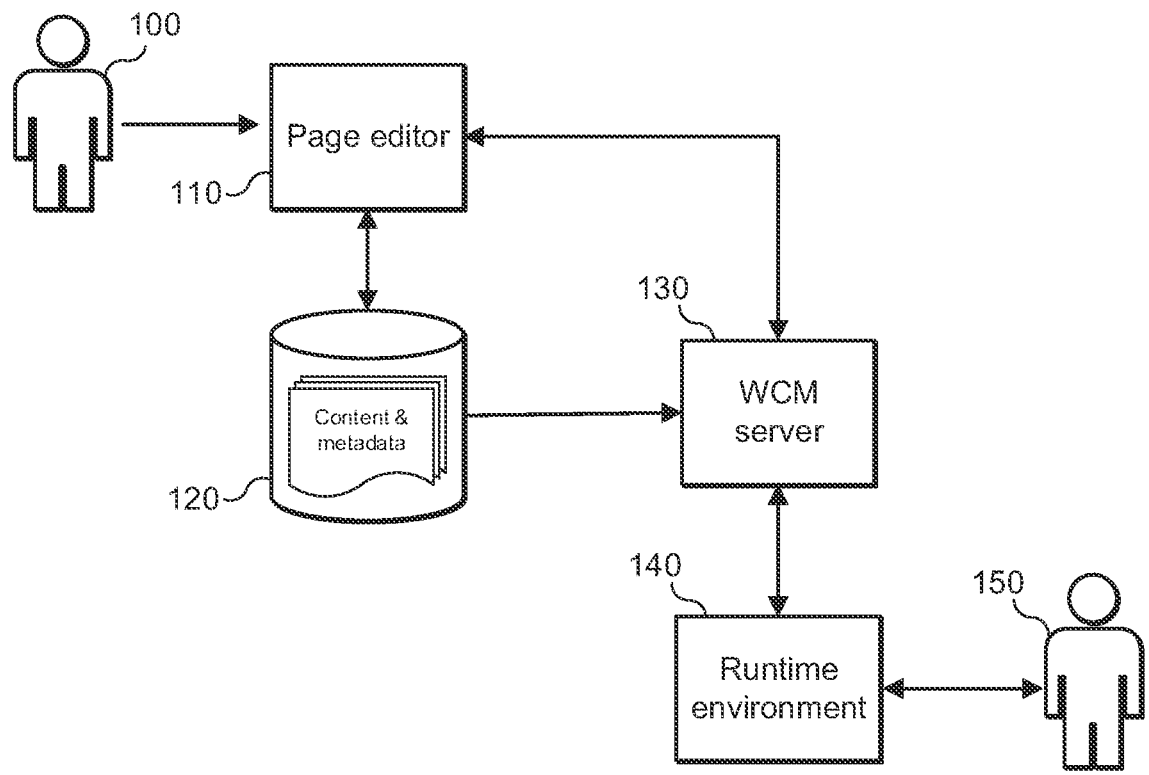
FIG. 1 is a diagrammatical illustration of a prior art web content management system.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

One exemplary web content management system is OpenText™ TeamSite™. This is a website content management system that helps organizations create personalized and visually rich digital customer experiences that can be optimized for any device, digital channel or context. This system simplifies the process of managing content across all channels, allowing a user to author, test, target and publish their content, and also manage rich media, design websites and create mobile applications from a single interface.

Embodiments of the present invention provide systems for web content management which enable content which is stored on a cloud-based filesharing system to be integrated into a separate content management system while allowing the cloud-based filesharing system to retain control of the content and using the native editor of the cloud-based filesharing system to edit the content.

In one embodiment, a system includes a web content management system having a local content repository. The system is coupled to one or more remote content resources (e.g., repositories of cloud-based filesharing systems) via a framework that has one or more corresponding adapters. Each adapter is configured to enable communication between a corresponding one of the remote content resources and the web content management system. The content management system is configured to retrieve content items from the remote content resources and to store copies of the content item in the local repository of the content management system while the original content item remains in the remote content resource. The content management system stores metadata with the content which may identify the corresponding source repositories and access control information. When an author wishes to edit a content item in the local repository, the author selects the content item in the local repository for editing. The content management system examines the metadata of the content item to identify the source repository, which may be one of the remote content resources (e.g., cloud-based filesharing systems' repositories). If the source of the content item is a repository that has an associated native editor, the content management system invokes the native editor of the source repository and enables editing of the content item with the native editor. The content management system then synchronizes the copy of the content item in the local repository to the edited version of the content item in the source repository.

Before describing the present embodiments, it may be helpful to provide an illustration of a prior art web content management system. An example of such a system is depicted in FIG. 1, which shows the general structure of a system for managing web content. As shown in this figure, a user 100 can use a page editor or other authoring tool 110 of the content management system to create or edit a page. This page may include various content items that are stored in a repository 120 of the content management system. Page editor 110 can invoke a component browser or similar means to communicate with a backend web content management service 130, allowing the user to pick specific content items from repository 120 to be used in the page that is being edited. The content in repository 120 may be indexed so that it can be accessed by a search engine and/or used by runtime environment 140, allowing a user 150 to view the content.

Such prior art content management systems may have a number of disadvantages. For instance, if the author wishes to use content that is originally found in a repository of a system which is remote from the content management system, the content management system typically copies the content to the local repository and edits this content with a local editor. As a result, the copy of the content in the local repository is different from the original content stored in the remote content resource, so users accessing the same content will see different things, depending upon which repository was accessed. Another problem is that the owner of the content originally stored in the remote content resource may wish to retain control of the content while allowing others to edit and use the content. In prior art content management systems, when the content is copied to the repository of the content management system, the original owner does not retain control of the copy.

Embodiments disclosed herein address these problems by providing a content management system which is coupled through an adaptable framework to one or more remote content resources (e.g., cloud-based filesharing systems), where content that is copied from the remote content resources is stored in the local repository of the content management system with information identifying the source of the content, so that when the content is edited by the content management system, the editing is performed on the original content in the remote source repository by a native editor associated with the remote source repository. The copy of the content in the local repository is then synchronized with the content in the remote content resources so that changes to the original content in the remote source repository are carried over to the copy in the local repository.

Figure 2:
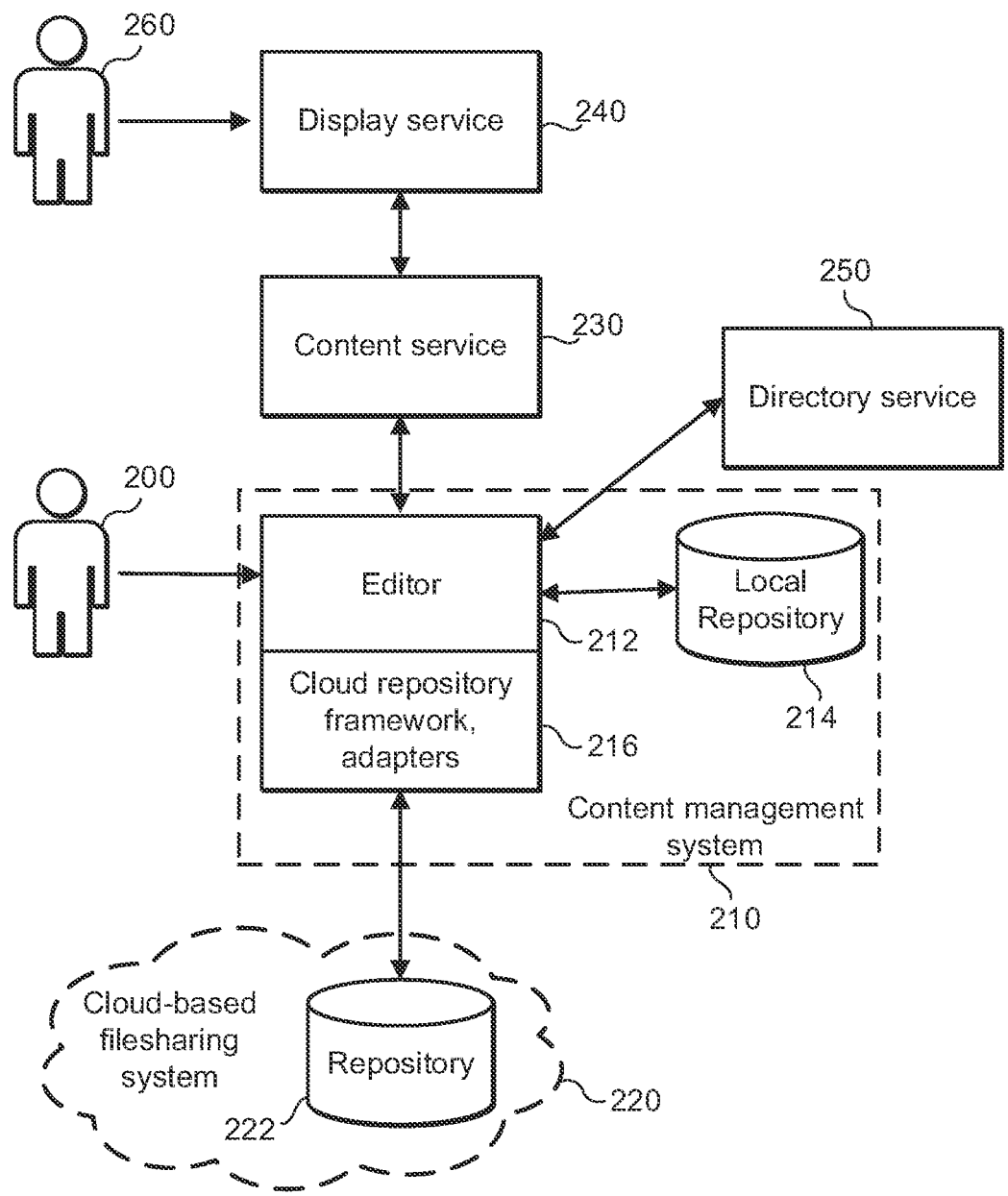
FIG. 2 is a diagrammatical illustration of a web content management system in accordance with some embodiments.

The structure of a content management system in accordance with some embodiments of the invention is illustrated in FIG. 2. In this example, an authoring user 200 has access to a content management system 210. Content management system 210 includes an editor 212 which is coupled to a local content repository 214. Content repository 214 may include original content or other content that can be directly edited by editor 212. Content management system 210 may also be coupled to a cloud-based filesharing system 220, which includes its own content repository 222. Because the cloud-based filesharing system is remote from the content management system, repository 222 may be referred to herein as a remote content resource. Content management system 210 includes an adaptable framework 216 through which the system can access cloud-based filesharing system 220 and repository 222. As will be described in more detail below, adaptable framework 216 may include multiple [pluggable] adapters, each of which is configured to enable access to a different remote system/repository. These adapters may be independently added two or removed from the framework to the addition of new content sources or the removal of existing sources.

Content management system 210 is also coupled to a content service 230 and/or a display service 240 which facilitate publishing of content by the content management system (e.g., as contained in webpages). Users and/or user groups 260 may access the content through display service 240 and/or content service 230. In this embodiment, content management system 210 is also coupled to a directory service 250 which maintains information on the users and/or user groups. This information may include for example, access control information which may be used by the system to determine which of the users and/or user groups can access particular webpages, or even particular content items that may be provided by the content management system.

Figure 3:
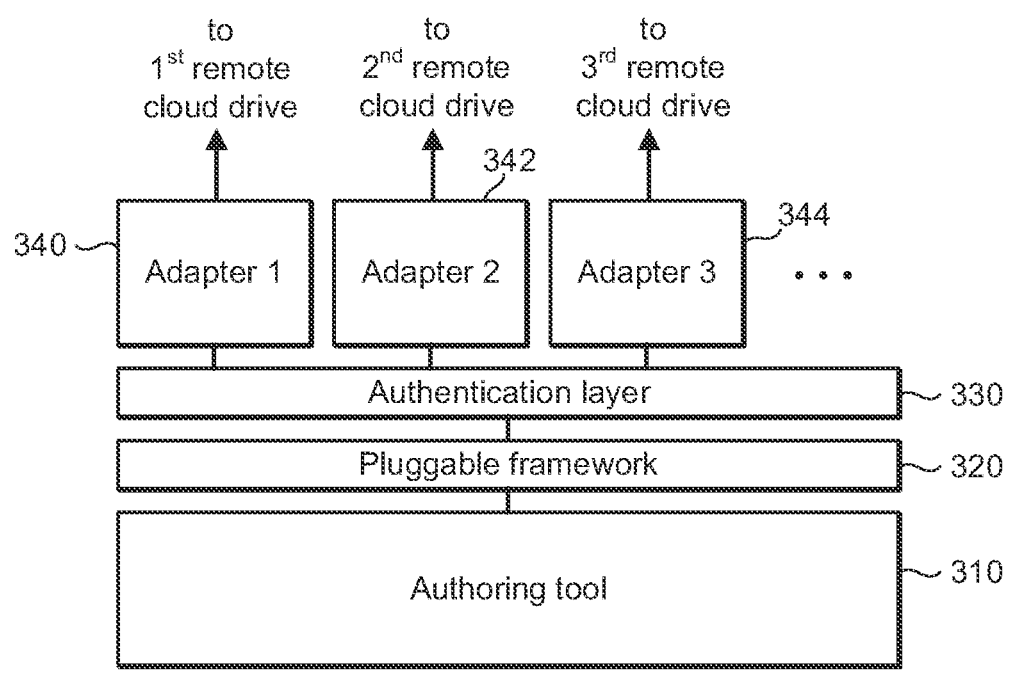
FIG. 3 is a diagrammatical illustration of the structure of the adaptable framework coupled between the content management system and the remote content resources in accordance with some embodiments.

Referring to FIG. 3, the structure of the adaptable framework coupled between the content management system and the remote content resources in accordance with some embodiments is shown. As depicted in this figure, pluggable framework 320 is coupled to an authoring tool (e.g., editor) 310. When an author using authoring tool 310 wishes to access content stored in a remote content resource (e.g., a repository of a cloud-based filesharing system), the access is made through pluggable framework 320 the pluggable framework is coupled to an authentication layer 330 which enables the framework to implement access controls with respect to the content in the remote repositories. In some embodiments, the access controls are implemented on an item-by-item basis. Thus, the ability of users and/or user groups to access content may be controlled at the level of individual piece of content, rather than at the level of a website or a webpage. Thus, users and/or user groups who have access to particular websites or webpages may nevertheless be prevented from accessing specific content items within these sites or pages if the users and/or user groups do not have authorization to access these particular content items.

As noted above, the content management system may be coupled to one or more remote content resources (e.g., cloud-based filesharing systems) so that users can access and/or edit content which originally resides in these resources. The adaptable framework therefore includes one or more adapters (340, 342, 344), each of which is configured to enable access through the framework and corresponding adapter to a corresponding one of the remote content repositories. In this example, three different adapters are depicted, but there may be more or less in a given embodiment. Thus, for example, one adapter may be configured to enable access to a Google drive repository, another adapter may be configured to enable access to a SharePoint repository, and another adapter may be configured to enable access to a Core Share repository. In one embodiment, framework 320 is a "pluggable" framework in which adapters may be independently added to or removed from the framework to enable or disable access to the corresponding remote content resources. If access to a new repository is desired, a corresponding adapter can be added to pluggable framework 320 without having to modify the framework or the existing adapters—the new adapter is simply provided and plugged into the framework.

Figure 4:
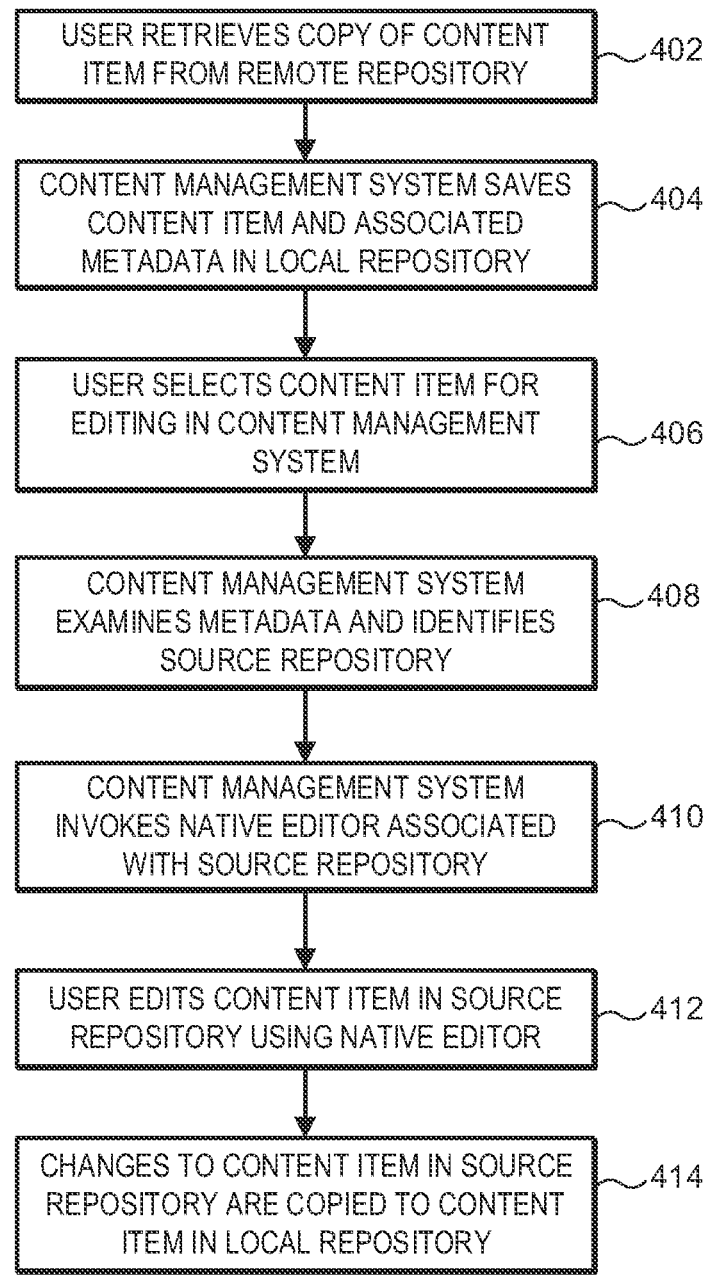
FIG. 4 is a flow diagram illustrating a method for editing content originating from a remote source repository in accordance with some embodiments.

Referring to FIG. 4, a flow diagram illustrating a method for editing content originating from a remote source repository in accordance with some embodiments is shown. In this method, a user of a content management system identifies a content item that is stored in a remote source repository and retrieves a copy of the content item from the remote content resource (402). In some embodiments, it may be necessary to authenticate the user and to verify that the user is authorized to access the content item before attempting to retrieve the item. After the content item has been retrieved from the remote source repository, a copy of the content item is stored in the local repository of the content management system (404). The original content item remains in the remote source repository. When the copy of the content item is stored in the local repository, the content management system also stores various items of metadata associated with the content item. A portion of these metadata items may have been stored with the original content item in the remote source repository. The content management system may, however, have stored additional items of metadata which were not stored by the source repository. For example, the content management system stores an indicator of the source repository so that when the content item is accessed for editing by the content management system, the source repository can be identified. The content management system may also store items of metadata comprising access control information. This information may be used by the content management system to enable access to the content item by authorized users, while restricting the access of users who are not authorized.

The user selects the content item for editing in the content management system (406). This may be accomplished, for example, by selecting the content item in a list of content items displayed in a window of the content management system and selecting an "edit" button. When the content item is selected for editing, the content management system examines the metadata associated with the content item in the local repository and identifies the remote source repository from which the content item was obtained (408). Rather than invoking the local editor of the content management system, the system invokes the native editor associated with the remote source repository (410). Invoking the native editor of the remote resource may be done transparently, so that it appears to the user as if the content item is being edited using an editor which is local to the content management system. When the user edits the content item, the native editor modifies the original content item in the remote source repository (412), rather than editing the local copy of the content item.

When modifications have been made to the original content item in the remote source repository, the content item stored in the local repository of the content management system can be synchronized with the remote copy (414). This may comprise replacing the content item in the content management system, or it may comprise communicating the changes to the content management system so that corresponding changes can be made to the local copy of the content item. Because the original content item in the remote source repository may be accessible by multiple users, each of whom may have made changes to the content item, one embodiment does not automatically synchronize the local copy of the content item with the original, but instead does so in response to a specific action (e.g., request) from the user of the content management system. This allows the user to determine whether the synchronization is desirable (e.g., in light of changes made by other users) before the synchronization actually occurs.

Figure 5:
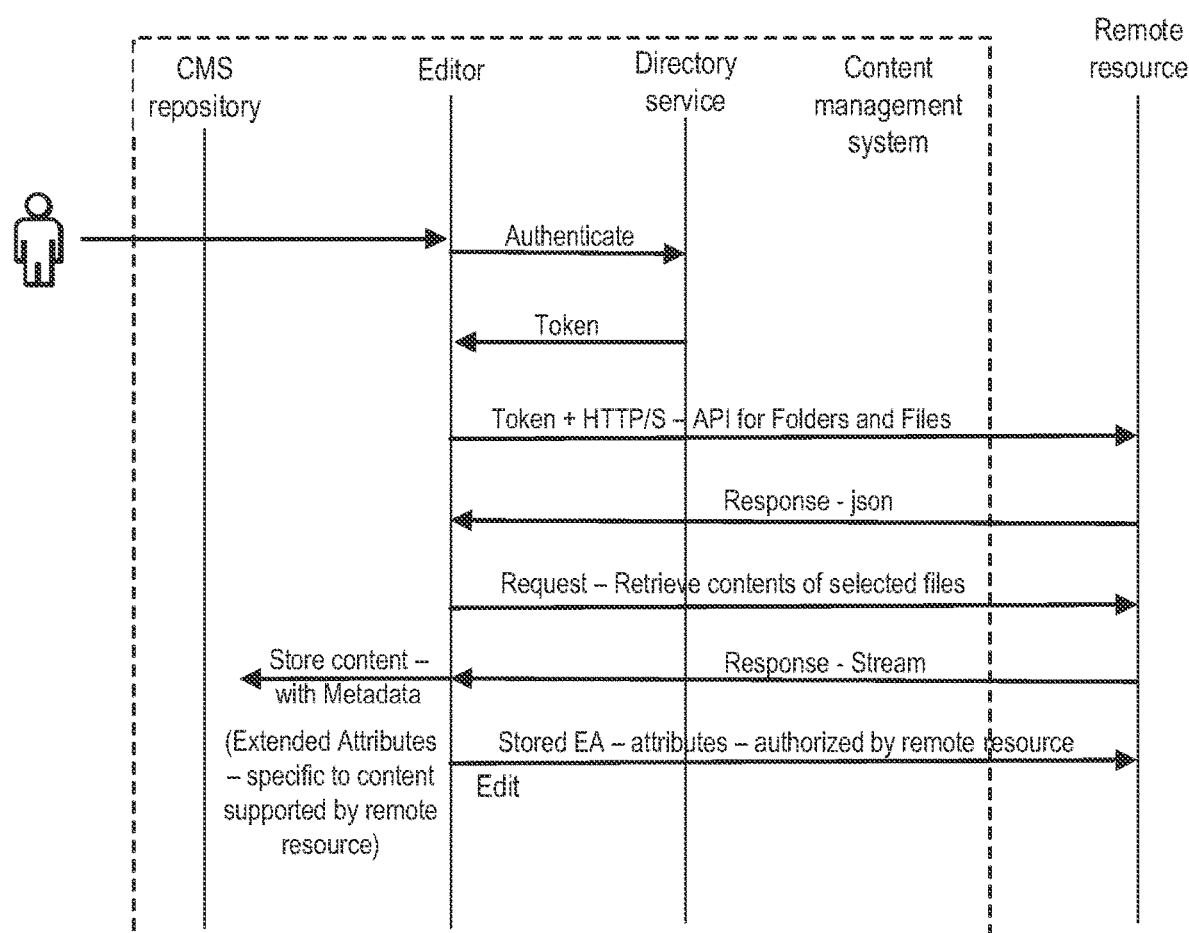
FIG. 5 is a flow diagram illustrating dataflow associated with the selection and editing of content in accordance with some embodiments.

Referring to FIG. 5, a flow diagram illustrating dataflow associated with the selection and editing of content in accordance with some embodiments is shown. In this example, the content desired by the user has not yet been downloaded from the remote content resource to the content management system. As depicted in the figure, a user initially communicates a request for a content item to an editor of the content management system. In response to this request, the editor sends an authentication message to a directory service. The directory service authenticates the user and returns a token to the editor. The data flow for the authentication is shown in more detail in FIG. 7.

The editor then transmits a message (HTTP/S with the token) to the API for the filesharing system having the remote content resource in which the content is stored in order to request the folders and files to which the user has access. The remote resource then provides a JSON response to the message identifying the files and folders that the user is allowed to access. After the editor receives the JSON response from the remote resource, the user can select the specific files (content items) that are desired, and a message requesting the selected files is transmitted from the editor to the remote filesharing system. In response to the request, the remote filesharing system retrieves the requested files (content items) and streams the files to the content management system.

When the files are received by the content management system, they are stored in the local repository of the content management system, along with the metadata associated with the content. This may include metadata that was stored with the content item in the remote filesharing system, as well as metadata newly generated by the content management system, such as an identifier of the remote filesharing system and a link to the native editor of the remote filesharing system. In one embodiment, the metadata may include such information as: Asset Version; Asset Web View Link; Asset Modified By; Asset File Extension; Image Width (pixels); Image Height (pixels); Video Width (pixels); Video Height (pixels); Video Duration (milliseconds); and Asset Description. The metadata may also include security information associated with the content item which is used to control access to the content. The security information may be specific to individual content items, so that access to specific content items may be individually controlled.

After the content has been downloaded to the local repository of the content management system, the user can select the content for editing. When a particular content item has been selected and the user chooses to edit the content item, the content management system examines the metadata associated with the content item. Using the stored metadata, the system can determine the remote filesharing system in which the content item is stored. The metadata may include a link to the native editor of the remote filesharing system. The system uses this link to access the native editor of the remote filesharing system. If the user is authorized to edit the file, the native editor is invoked and the user edits the content item using the native editor. If the user is not authorized, the user will not be allowed to edit the file with the native editor.

As noted above, this embodiment does not automatically synchronize the locally stored copy of the content item with the original when the user has completed the desired edits to the content item. The synchronization is instead performed in response to a specific request or action by the user of the content management system in order to allow the user to determine whether synchronization is desirable in light of any edits to the original content item made by other users. In one embodiment, when the user accesses a content item in the local repository of the content management system, the system will examine the metadata to determine a version of the locally stored content item. The system will then check the remote content resource to determine whether the content item stored there is a different version of the content item. If there is no difference, the system will proceed with the access to the locally stored copy. If there is a difference between the versions of the locally stored copy of the content item and the content item in the remote resource, the system will notify the user so that the user can examine the remotely stored content item and determine whether to copy the remotely stored version to the local repository of the content management system. If the user elects to synchronize the content item, the remote filesharing system will responsively transmit data to the content management system to synchronize the content item stored locally in the content management system's repository with the edited content item stored in the repository of the remote filesharing system.

The foregoing examples illustrate how embodiments of the present content management system can access content contained in a remote content resource, edit the content in the remote resource using a native editor, and synchronize a local copy of the content which can be used to assemble webpages or otherwise make use of the content. Although the examples show how the content management system interacts with a single one of the remote content resources, the system may include adapters for multiple remote resources. The methodology described above for accessing and editing content items may be the same for any of the available remote resources.

Embodiments of the content management system disclosed herein therefore enable users to access content which may be stored in any of the remote content resources for which the system has a corresponding adapter. This allows users to pull content from any of these remote resources to use in assembling webpages or similar content at the content management system. Since the adapters enable the content management system to invoke the native editor associated with each of the content items, the user of the content management system can edit their respective content items without having to convert the content to be compatible with the system's local editor. Additionally, the user does not have to be concerned with distributing the locally edited copy to the source and to any other users of the content. Further, as noted above, the present embodiments allow the owner of the content to maintain control of the original content, which is stored in the remote source repository.

Figure 6:
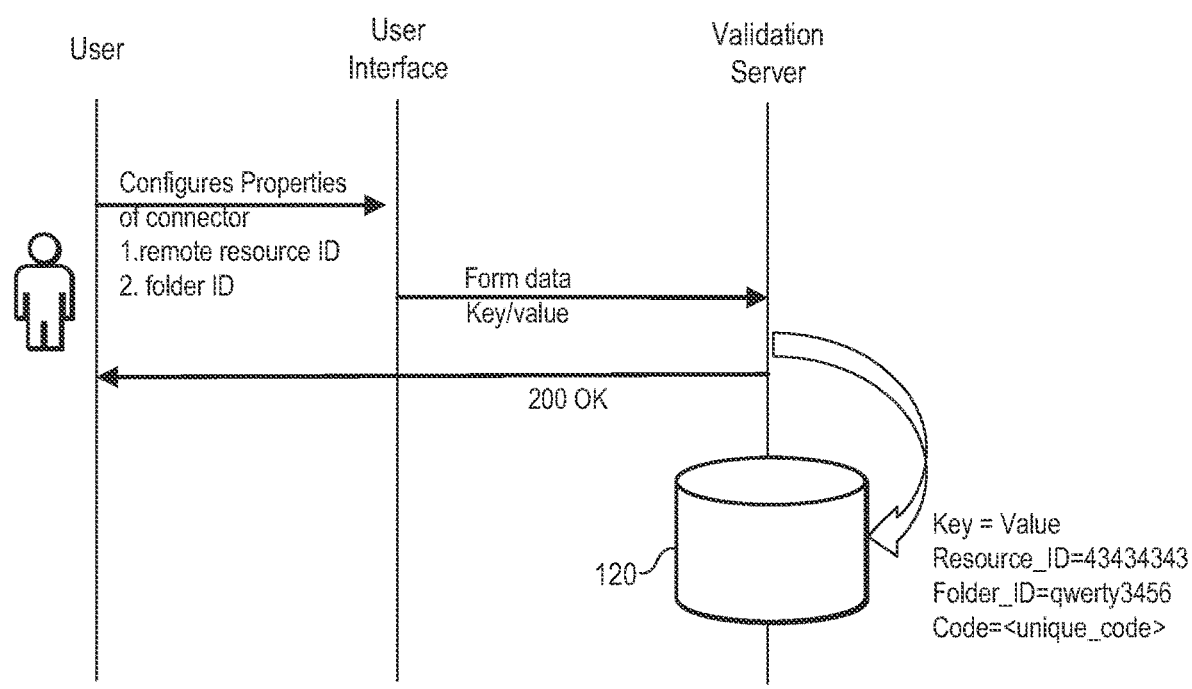
FIG. 6 is a dataflow diagram illustrating the initial configuration of the adapter for accessing the remote filesharing system.

Referring to FIG. 6, a dataflow diagram illustrating the initial configuration of the adapter for accessing the remote filesharing system is shown. This configuration process is repeated for each of the adapters that are connected to the adaptable framework. The configuration of the adapter is required so that the system can provide, in conjunction with a directory service, authentication of a user who accesses the system. The directory service generates an authentication token that is used by the system for access to the remote content resource.

As depicted in this figure, a user (administrator) provides configuration information for the adapter to a user interface. The information may include, for example, an identifier of the remote content resource that will be accessed through the adapter, an identifier of a folder within the repository, etc. The user interface then sends the data as a set of key-value pairs to a configuration server of the content management system. In the example depicted in the figure, a first key is "Resource_ID" and the corresponding value is "43434343", a second key is "Folder_ID" which has a corresponding value of "qwerty3456", and so on. The content management system stores the received information in an associated database within the content management system. When the configuration information has been saved, the configuration server provides an acknowledgment to the user, and the configuration of the adapter is complete.

Figure 7:
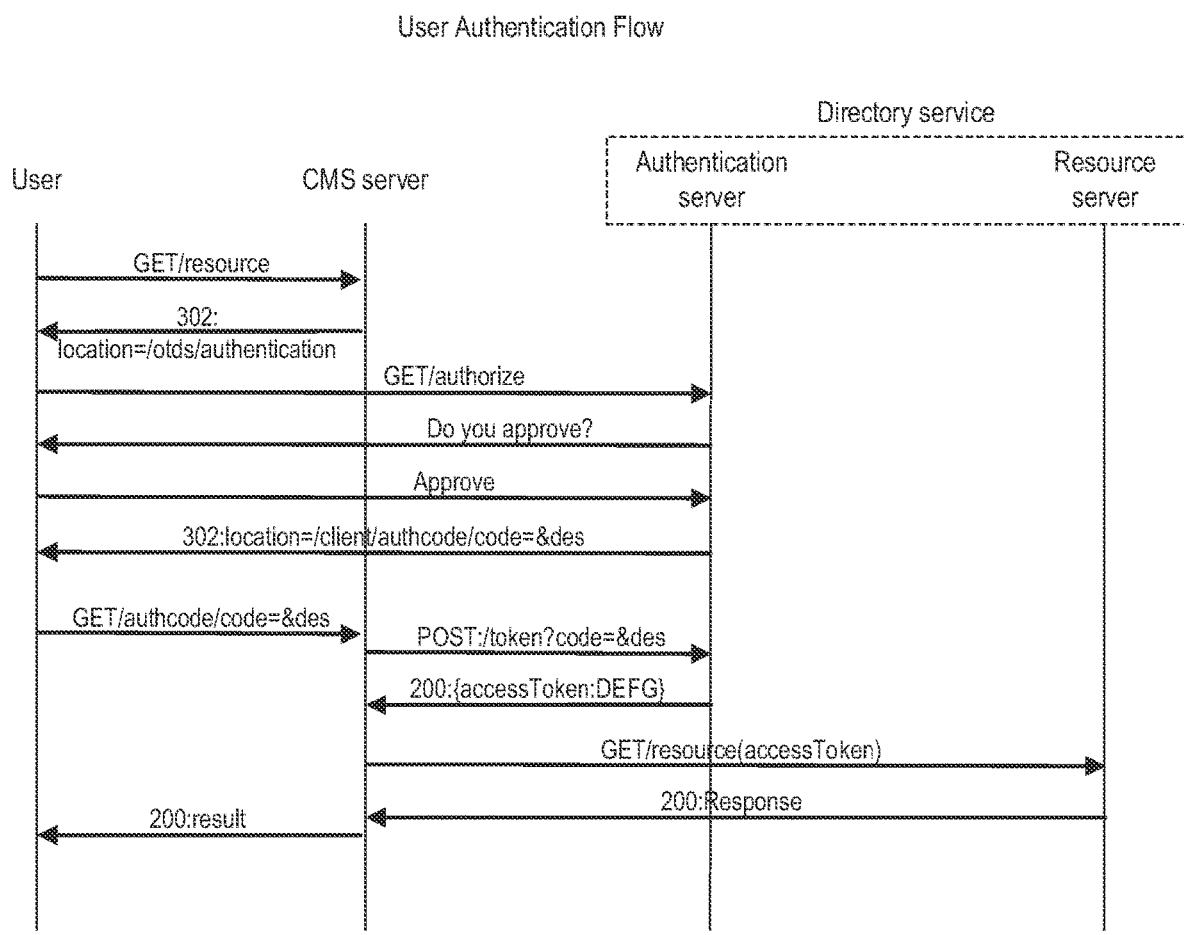
FIG. 7 is a diagram illustrating an example of the detailed data flow in the authentication of a user request.

Referring to FIG. 7, a diagram illustrating an example of the detailed data flow in the authentication of a user request is shown. As noted above, this detail corresponds to the initial messages in FIG. 5, in which authentication is requested by a user and a token is returned by the directory service. FIG. 7 depicts a process having two stages. In the first stage, the user is validated against an identity server to determine whether the user is an authorized user. If the user is a validated user, the process moves to the second stage, in which the user requests an access token that is used to authorize the user's communications with the remote content resource.

As depicted in FIG. 7, a user first logs in to an authoring tool of the content management system. A message (GET/resource) is sent to a server of the content management system (acting as an authentication client) to request a resource. The authentication client identifies the resource and then redirects the user to the identified resource by responding with a location of an authorization server of a directory service (302:location=/otds/authentication).

The user then sends a message (GET/Authorize) to the authorization server of the directory service in order to obtain authorization to access desired content in the remote content resource. The authorization server responds with a message requesting confirmation of approval. The user responds to this message with confirmation of approval. Once it has been determined that the user is an authorized user and the user approves, the authorization server of the directory service sends an authorization code to the user (302:location=/client/authcode/code=des).

The user can then request a token from the authentication client of the content management system using the authentication code (GET/authcode/code=&des). The authentication client sends a message with the authentication code to the authentication server of the directory service (POST:/token?code=&des). In response to this message, the authentication server sends an access token to the authentication client (200:{accessToken:DEFG}). When the access token is received by the content management system's authentication server, it sends a resource request containing the token to the remote resource (GET/resource(accessToken)).

The remote content resource will store the token (which will authorize the remainder of the communication between the user and the remote resource) and will respond to the authentication client (200:Response), which will in turn respond to the user (200:Result).

Figure 8:
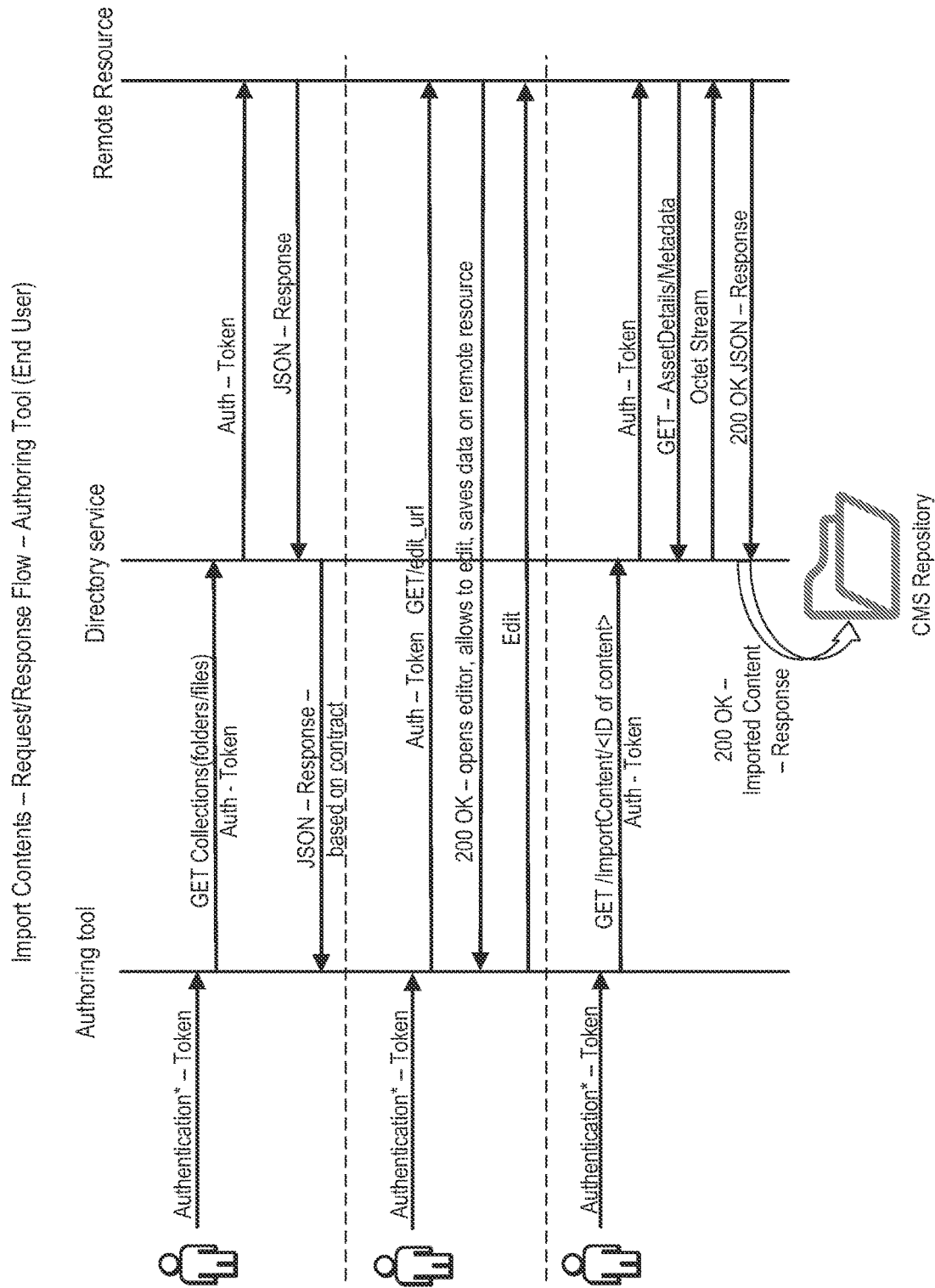
FIG. 8 is a diagram illustrating data flows associated with importing content, editing content, and synchronizing content in accordance with some embodiments.

Referring to FIG. 8, a diagram illustrating data flows in accordance with some embodiments is shown. In this figure, the messages that are communicated between the authoring tool, authentication server and remote content resource are shown in groups corresponding to three general phases: getting folders/files, editing a content item, and synchronizing a content item. The data flows are substantially the same as those shown in FIG. 5.

In the first phase, the user accesses the local authoring tool of the content management system which sends a message to a content management system server requesting a collection of content in the remote content resource. The request includes the user's authorization to access the collection, as represented by an access token. The content management system server then requests the collection from the remote resource using the access token. The resource responds to the server's request, identifying the folders/files which the user is authorized to access (e.g., based on a subscription or similar contract). The content management system server in turn sends a response to the authoring tool identifying the folders/files that are authorized to be accessed.

In the second phase, the user selects a content item to be edited. The authoring tool of content management system sends a message to the remote content resource (e.g., by accessing a link in the metadata of the content item) to invoke the native editor of the remote resource. The remote resource responds, enabling access to the native editor by the user. The user then edits the content item as desired using the native editor of the remote content resource.

In the third phase, the user may initiate synchronization of the content item stored in the local repository of the content management system. In response to user input, the authoring tool sends a message to the server of the content management system to import the edited content from the remote content resource. The server sends the access token to the remote resource, and requests the content item and associated metadata. The remote resource responds by streaming the content to the server of the content management system. The server acknowledges the transmission of the data and stores the content item and associated metadata in the local repository of the content management system.

Figure 9:
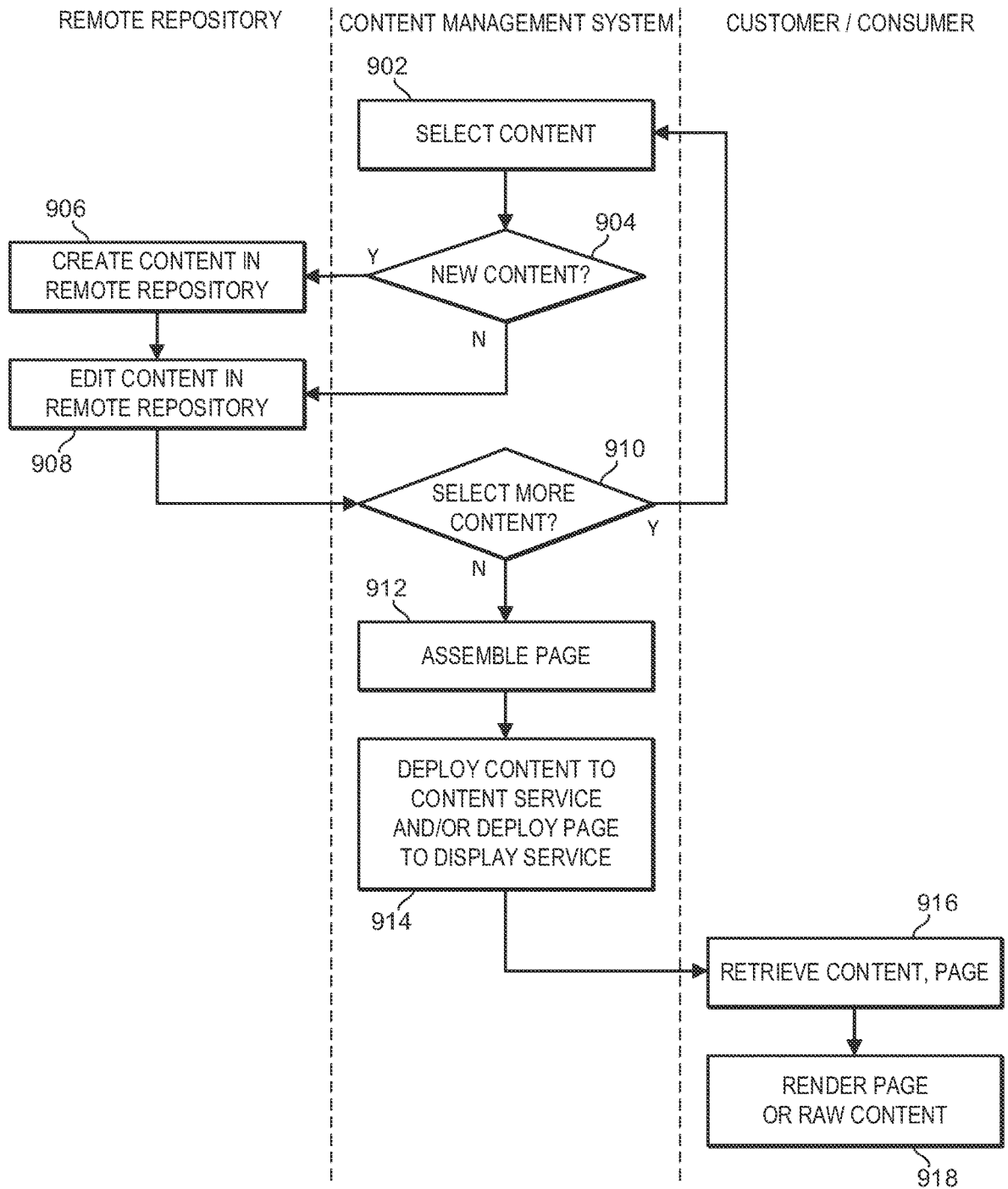
FIG. 9 is a flow diagram illustrating the use of the system to pull content from various remote content resources and to publish the content using the content in accordance with some embodiments.

Referring to FIG. 9, a flow diagram illustrating the use of the system to pull content from various remote content resources and to publish the content (e.g., in webpages) using the content in accordance with some embodiments is shown. The user initially accesses the content management system to select desired content (902). If the content is new and does not already exist in the remote content resource (904), the user may create the new content in the repository (906). The user may then edit the content in the remote resource using the native editor (908). If the selected content already exists in the remote resource (904), the user may proceed to edit the existing content with the native editor (908). The edited content is stored in the remote resource. This may be repeated (910) until all of the desired content has been edited and stored in the remote resource.

After the content has been edited, the user may select the content in the content management system to use the content in, for example, assembling a webpage (912). As noted above, the content in the local repository of the content management system is not automatically synchronized with the content in the remote content resource when this content is edited. If the user selects a content item in the local repository of the content management system to be used (e.g., published) in some manner, the version of the local copy of the content item will be checked with respect to the version stored in the remote resource, and the user may choose to synchronize the local copy with the remotely stored content item. Alternatively, the user may elect to use the local copy of the content item without synchronizing it to the remotely stored content item. When the selected content items have been assembled (as needed), the content is deployed to a content service and/or to a display service (914), where it can be accessed by a consumer of the content. The consumer (e.g., an application such as a customer relationship manager) can retrieve the content from the content service or display service (916), and can render the content in a webpage or use the raw content (918).

Embodiments of the technology may be implemented on a computing system. Any combination of mobile desktop, server machine, embedded or other types of hardware may be used. One exemplary embodiment may be implemented in a distributed network computing environment. The computing environment in this embodiment includes a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The client computer system may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages) and a server program configured to extend the functionality of the page processing program. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered.

The server computer system may include, for example, a computer processor and associated memory. The computer processor may be an integrated circuit for processing instructions. For example, the processor may comprise one or more cores or micro-cores of a processor. The processor may comprise a CPU. The memory may include volatile memory, non-volatile memory, semi-volatile memory or a combination thereof. The memory, for example, may include RAM, ROM, flash memory, a hard disk drive, a solid state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. Server computer system 830 may also include I/O devices. The server computer system may also include a communication interface, such as a network interface card, to interface with the network.

The memory may store instructions executable by the processor. For example, the memory may include an operating system and application server code. The application server code can be executable to receive requests from client computers, such as the client computer system, generate or server page files from a set of page assets (e.g., complete web pages, page fragments, scripts or other assets) and return page files in response. A page file may reference additional resources, such as style sheets, images, videos, audio, scripts or other resources at the server computer system or at other network locations, such as at additional server systems.

According to one embodiment, the network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for editing content, the method comprising:
   coupling, by an adaptable framework, an authoring tool to a remote file sharing system;
   receiving, by the adaptable framework, a user request to edit a copy in a local repository of a content item in the remote file sharing system;
   invoking, by the adaptable framework in response to a user request to edit the local copy of the content item, a native editor of the remote file sharing system;
   receiving, by the adaptable framework, user edits to the content item and forwarding the user edits to the native editor;
   synchronizing, by the adaptable framework, the copy of the content item in the local repository with the edited content item stored on the remote file sharing system.

2. The method of claim 1, further comprising, in response to the user request, receiving, by the adaptable framework, metadata associated with the copy of the content item in the local repository, identifying from the metadata the remote file sharing system in which the content item is stored, and invoking the native editor of the identified remote file sharing system.

3. The method of claim 1, further comprising providing the synchronized copy of the content item in the local repository to at least one of a content server and a display server.

4. The method of claim 1, further comprising, in response to the user request, authenticating a user originating the user request.

5. The method of claim 1, further comprising storing metadata with the copy of the content item in the local repository, wherein the metadata includes one or more metadata elements that are locally generated and which are not stored on the remote file sharing system.

6. The method of claim 5, wherein the metadata includes security information specific to the content item.

7. The method of claim 5, wherein the metadata identifies the remote file sharing system on which the content item is stored.

8. A system comprising:
an adaptable framework coupled between an authoring tool which is connected to a local repository and a plurality of repositories which are located remotely from the authoring tool;
wherein the adaptable framework is configured to
store a copy of a content item from one of the plurality of remotely located repositories in the local repository, and
receive from the authoring tool a user request to edit a copy of a content item from one of the plurality of remotely located which is stored in the local repository,
invoke a native editor associated with the one of the plurality of remotely located repositories to edit the content item stored in the one of the plurality of remotely located repositories, and
synchronize the content item stored in the one of the plurality of remotely located repositories to the locally stored copy of the content item.

9. The system of claim 8, wherein the adaptable framework has a plurality of adapters, wherein each adapter is configured to communicate with a different one of a plurality of remotely located repositories, wherein each of the remotely located repositories has a different native editor.

10. The system of claim 8, wherein the adaptable framework includes an authentication layer, wherein in response to a request from a user to the authoring tool to access one of the content items, the authentication layer is configured to authenticate the user prior to enabling access to the content item.

11. The system of claim 10, wherein the authentication layer is configured to authenticate the user by accessing a directory service that maintains data identifying one or more customer user groups and associated content items which each user group is authorized to access.

12. The system of claim 10, wherein the authentication layer is configured to, in response to the request from the user to the authoring tool to access one of the content items, obtain a token authenticating the user, wherein the authentication layer is configured to provide the token to the adapter corresponding to the one of the plurality of remotely located repositories containing the one of the content items in the request from the user.

13. The system of claim 8, wherein the adaptable framework comprises an adaptable framework which is configured to accept, without changes to the adaptable framework or one or more existing adapters, one or more additional adapters which are configured to communicate with a corresponding additional repository which is located remotely from the authoring tool.

14. A computer program product comprising a non-transitory computer-readable medium storing instructions executable by one or more processors to perform:
in response to a user request to edit a local copy of a content item stored in a remote file sharing system, invoking a native editor of the remote file sharing system; and
synchronizing the copy of the content item in the local repository with the edited content item stored on the remote file sharing system.

15. The computer program product of claim 14, wherein the instructions are further executable to perform, in response to the user request, examining metadata associated with the copy of the content item in the local repository, identifying from the metadata the remote file sharing system in which the content item is stored, and invoking the native editor of the identified remote file sharing system.

16. The computer program product of claim 14, wherein the instructions are further executable to perform providing the synchronized copy of the content item in the local repository to at least one of a content server and a display server.

17. The computer program product of claim 14, wherein the instructions are further executable to perform, in response to the user request, authenticating a user originating the user request.

18. The computer program product of claim 14, wherein the instructions are further executable to perform storing metadata with the copy of the content item in the local repository, wherein the metadata includes one or more metadata elements that are locally generated and which are not stored on the remote file sharing system.

19. The computer program product of claim 18, wherein the metadata includes security information specific to the content item.

20. The computer program product of claim 18, wherein the metadata identifies the remote file sharing system on which the content item is stored.

* * * * *